(12) United States Patent
Kim et al.

(10) Patent No.: US 12,308,478 B2
(45) Date of Patent: May 20, 2025

(54) BATTERY CELL, BATTERY MODULE, AND MANUFACTURING METHOD OF THE SAME

(71) Applicant: SK On Co., Ltd., Seoul (KR)

(72) Inventors: Jae Hun Kim, Daejeon (KR); Hyeong Won Kim, Daejeon (KR); Sung Chel Yoon, Daejeon (KR); Ki Dong Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/415,647

(22) Filed: Jan. 18, 2024

(65) Prior Publication Data
US 2024/0283110 A1    Aug. 22, 2024

(30) Foreign Application Priority Data
Feb. 17, 2023    (KR) .................. 10-2023-0021691

(51) Int. Cl.
*H01M 50/553* (2021.01)
*H01M 50/178* (2021.01)
*H01M 50/211* (2021.01)
*H01M 50/505* (2021.01)
*H01M 50/516* (2021.01)

(52) U.S. Cl.
CPC ....... *H01M 50/553* (2021.01); *H01M 50/178* (2021.01); *H01M 50/211* (2021.01); *H01M 50/505* (2021.01); *H01M 50/516* (2021.01)

(58) Field of Classification Search
CPC ............. H01M 50/553; H01M 50/516; H01M 50/178; H01M 50/211; H01M 50/505
See application file for complete search history.

(56) References Cited

U.S. PATENT DOCUMENTS

| 2019/0198952 | A1  | 6/2019 | Choi et al. |
| 2020/0259152 | A1* | 8/2020 | Lee ........................ H01M 50/50 |
| 2022/0181727 | A1  | 6/2022 | Park et al. |

FOREIGN PATENT DOCUMENTS

| CN | 109792014 A | 5/2019 |
| CN | 110233231 A | 9/2019 |

(Continued)

OTHER PUBLICATIONS

KR20150103496 translation (Year: 2015).*

(Continued)

*Primary Examiner* — Jane J Rhee
(74) *Attorney, Agent, or Firm* — IP & T GROUP LLP (57) ABSTRACT

The present disclosure relates to a battery module including: an electrode assembly capable of storing and supplying electrical energy; a battery exterior material of a hexahedral shape accommodating the electrode assembly therein; a first tab portion that is electrically connected to the electrode assembly and that protrudes to an outside of the battery exterior material; and a second tab portion that extends in the first direction from a free end of the first tab portion and that is provided with a different length from a predetermined length of the first tab portion, based on a second direction in parallel with a shortest edge of the battery exterior material among direction perpendicular to the first direction; and a bus bar assembly positioned between the battery exterior material and the second tab portion to be electrically connected to the electrode assembly.

12 Claims, 12 Drawing Sheets

(56) References Cited

FOREIGN PATENT DOCUMENTS

| | | | |
|---|---|---|---|
| CN | 111527626 | A | 8/2020 |
| CN | 114883754 | A | 8/2022 |
| KR | 10-2015-0103496 | A | 9/2015 |
| KR | 10-2020-0062138 | A | 6/2020 |
| KR | 10-2020-0097510 | A | 8/2020 |
| KR | 10-2024-0128476 | A | 8/2024 |

OTHER PUBLICATIONS

Extended European Search Report for European Patent Application No. 24152109.5 issued by the European Patent Office on Jul. 18, 2024.
Office Action for the U.S. Appl. No. 18/415,661 issued by the USPTO on Jun. 14, 2024.

\* cited by examiner

BATTERY CELL, BATTERY MODULE, AND MANUFACTURING METHOD OF THE SAME

CROSS-REFERENCE TO RELATED PATENT APPLICATION

The present application claims priority under 35 U.S.C. § 119(a) to Korean patent application number 10-2023-0021691 filed on Feb. 17, 2023, in the Korean Intellectual Property Office, the entire disclosure of which is incorporated by reference herein.

BACKGROUND OF THE INVENTION

1. Field

This disclosure relates to a battery cells, a battery module, and a manufacturing method of a battery module. Specifically, it relates to a structure of a battery cell, a battery module using the same, and a manufacturing method of a battery module.

2. Description of the Related Art

As the electronics, communications, and space industries develop, demand for secondary batteries as an energy power source is drastically increasing. In particular, as the importance of global eco-friendly policies is emphasized, the electric vehicle market is growing swiftly, and research and development on secondary batteries is being actively conducted worldwide.

A secondary battery may be divided into battery cells, battery modules, and battery packs depending on the assembly unit. Due to tolerances occurring in the manufacturing process, the length of each battery cell may be different. When battery modules are manufactured, the length of battery cells needs to be uniform in order to stack them efficiently and improve structural stability. In this process, a cut-bending process for adjusting the length between battery cells may be carried out. There is a problem that production is slowed down and production cost is increased due to a cut-bending process.

SUMMARY OF THE INVENTION

A problem that the present disclosure aims to solve is to manufacture battery cells of a uniform length and to provide a battery module including such battery cells.

Another problem that the present disclosure aims to solve is to provide a battery module with improved structural stability and energy density by stably combining a bus bar assembly and battery cells.

In addition, the present disclosure can be widely applied in the field of green technology, such as electric vehicles, battery charging stations, solar power generation, and wind power generation using batteries.

In addition, the present disclosure can be used in eco-friendly electric vehicles, hybrid vehicles, and the like to prevent climate change by suppressing air pollution and greenhouse gas emissions.

A battery module according to the present disclosure includes: a plurality of battery cells and a bus bar assembly connecting the plurality of battery cells, wherein each of the plurality of battery cells includes an electrode assembly capable of storing and supplying electrical energy; a battery exterior material accommodating the electrode assembly therein; and an electrode lead including a first tab portion that is electrically connected to the electrode assembly and that protrudes to an outside of the battery exterior material, and a second tab portion that extends along a first direction in which the first tab portion protrudes from a free end of the first tab portion and that has a different shape from the first tab portion, and wherein the bus bar assembly is positioned between the battery exterior material and the second tab portion to be electrically connected to the electrode lead.

The second tab portion may be provided with a different length from the length of the first tab portion, based on a second direction perpendicular to a surface provided with the largest area among surfaces of the battery exterior material disposed along the first direction.

The bus bar assembly may be welded with the first tab portion or the second tab portion to be electrically connected thereto.

Based on the second direction, the length of the second tab portion may be equal to or longer than the length of the first tab portion.

The free end of the first tab portion and one end of the second tab portion connected to the free end of the first tab portion may have a same length along a third direction perpendicular to the first direction and the second direction.

The length of the second tab portion along the third direction may be variable along the first direction.

The second tab portion may have a cylindrical shape extending along a third direction perpendicular to the first direction and the second direction.

The bus bar assembly may include one or more insertion portions with one side at least a part of which is open along the third direction.

The first tab portion may be inserted into the one or more insertion portions.

Based on the second direction, the length of the second tab portion may be equal to or longer than the length of the insertion portion.

The bus bar assembly may be positioned closer to the second tab portion than the battery exterior material.

Based on a third direction perpendicular to the first direction and the second direction, the first tab portion and the second tab portion may be formed to be equal to or shorter than the length of the battery exterior material.

Meanwhile, a battery cell according to the present disclosure includes: an electrode assembly capable of storing and supplying electrical energy; a battery exterior material of a hexahedral shape accommodating the electrode assembly therein; a first tab portion that is electrically connected to the electrode assembly and that protrudes to an outside of the battery exterior material; and a second tab portion that extends along a first direction in which the first tab portion protrudes from a free end of the first tab portion and that is provided with a different length from a predetermined length of the first tab portion, based on a second direction perpendicular to a surface provided with the largest area among surfaces of the battery exterior material disposed along a first direction.

The length of the second tab portion may formed to be equal to or longer than the length of the first tab portion.

Meanwhile, a manufacturing method of a battery module according to the present disclosure, which is a manufacturing method of a battery module including an electrode assembly capable of storing and supplying electrical energy; a battery exterior material accommodating the electrode assembly therein; and a first tab portion that is electrically connected to the electrode assembly and that protrudes to an outside of the battery exterior material, includes: a step of disposing in a predetermined spacing a second tab that extends along a first direction in which the first tab portion protrudes from a free end of the first tab portion and that is provided with a different length from a predetermined length of the first tab portion, based on a second direction perpendicular to a surface provided with the largest area among surfaces of the battery exterior material disposed along the first direction; a step of positioning the pre-assembled electrode assembly, the battery exterior material, and the first tab portion between the second tab portions spaced in the above spacing; and a step of electrically connecting a bus bar assembly to the second tab portion.

The step of electrically connecting the bus bar assembly to the second tab portion may include a step of positioning the bus bar assembly between the battery exterior material and the second tab portion.

The step of positioning the bus bar assembly between the battery exterior material and the second tab portion is characterized in that the bus bar assembly may move toward the first tab portion along a third direction perpendicular to the first direction and the second direction so that the first tab portion may be inserted into the bus bar assembly.

The step of electrically connecting the bus bar assembly to the second tab portion may further include a step of moving the bus bar assembly in a first direction away from the battery exterior material to be in contact with the second tab portion.

The step of electrically connecting the bus bar assembly to the second tab portion may further include a step of welding the bus bar assembly and the second tab portion.

The step of welding the second tab portion may be performed by irradiating laser to the second tab portion.

Through the present disclosure, battery cells with a uniform length can be manufactured, and a battery module with improved energy density may be provided.

In addition, a battery module with improved structural stability and energy density can be provided by stably combining a bus bar assembly and battery cells.

In addition, the production speed of battery cells and battery modules can be improved, and the production cost can be reduced.

DETAILED DESCRIPTION

Hereinafter, preferred embodiments of the present disclosure will be described in detail with reference to the attached drawings. The configuration or control method of the device described below is only for explaining the embodiments of the present disclosure and is not intended to limit the scope of the present disclosure, and the same reference numerals used throughout the specification indicate the same components.

Specific terms used in this specification are merely for convenience of explanation and are not used to limit the illustrated embodiments.

For example, expressions such as "same" and "is the same" not only indicate a strictly identical state, but also indicate a state in which there is a difference in tolerance or the degree to which the same function is obtained.

For example, expressions representing relative or absolute arrangement such as "in a certain direction," "along a certain direction," "side by side," "perpendicularly," "at the center," "concentric," or "coaxial," not only strictly represent the arrangement, but also represent the state of relative displacement with a tolerance, or an angle or distance at which the same function is obtained.

To explain the present disclosure, it will be described below based on a spatial orthogonal coordinate system with X, Y, and Z axes orthogonal to each other. Each axis direction (X-axis direction, Y-axis direction, Z-axis direction) refers to both directions in which each axis extends.

The X-direction, Y-direction, and Z-direction mentioned below are for explanation so that the present disclosure may be clearly understood, and of course, the directions may be defined differently depending on where the reference is placed.

The use of terms such as 'first, second, and third' in front of the components mentioned below is only to avoid confusion about the components to which they are referred and is irrelevant to the order, importance, or master-slave relationship between the components, etc. For example, an invention that includes only a second component without a first component may also be implemented.

As used in this specification, singular expressions include plural expressions unless the context clearly dictates otherwise.

Figure 1:
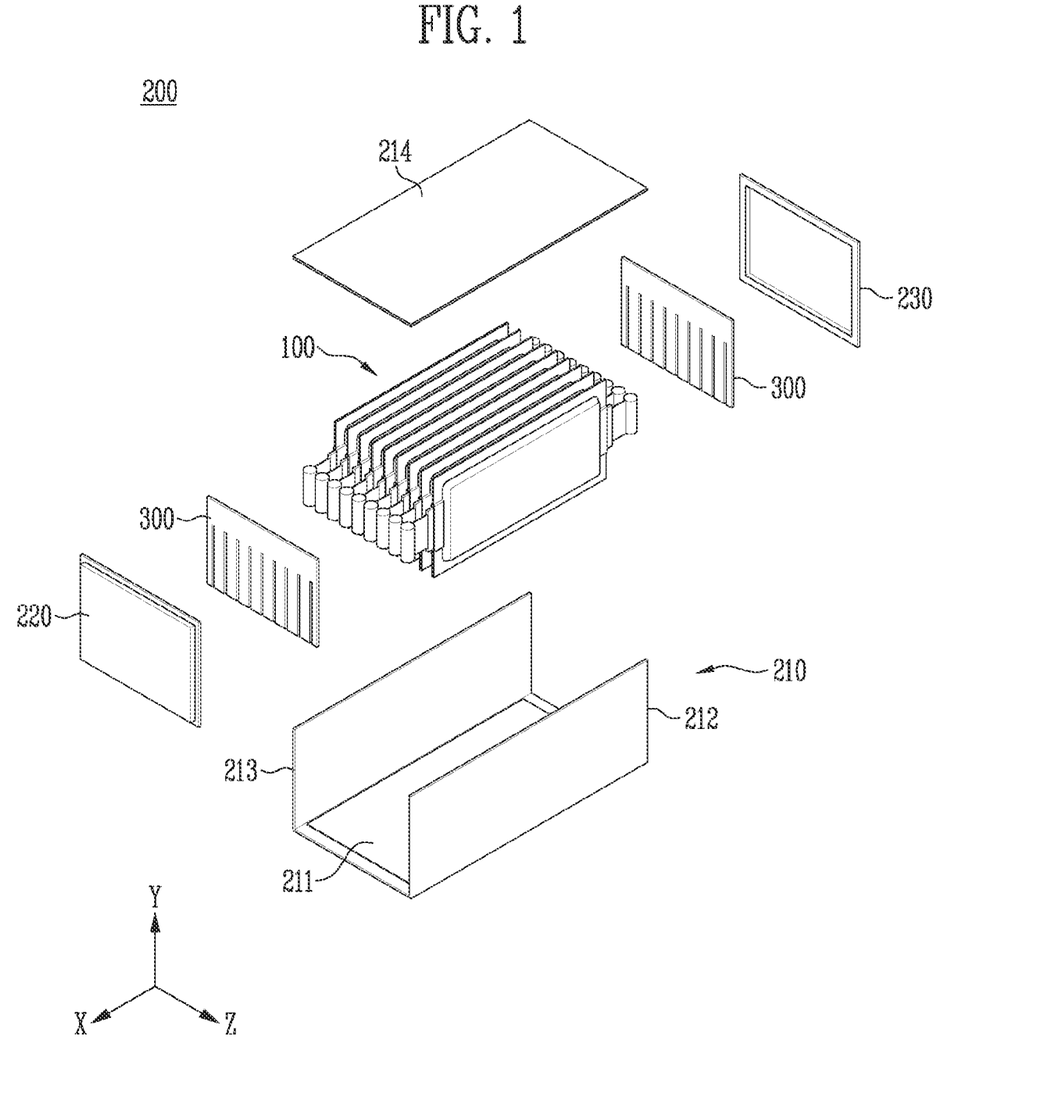
FIG. 1 is an exploded diagram of a battery module according to the present disclosure.

FIG. 1 is an exploded diagram of a battery module according to the present disclosure.

A battery cell described in this specification refers to a secondary battery that may be used repeatedly by charging and discharging electrical energy. For example, it may be a lithium secondary battery. However, a battery cell described in the present specification is not limited to a lithium secondary battery.

The main components of a battery cell are a cathode, an anode, and an electrolyte, and these main components are placed in a case (or pouch). A battery cell further includes an electrode lead protruding out of a case for electrical connection to the outside. An electrode lead may be connected to each of a cathode and an anode of a battery cell.

Meanwhile, a battery module described in the present specification refers to a battery assembly in which one or more of battery cells are grouped and placed in a case to protect them from external shock, heat, vibration, etc. and to have high output and high capacity characteristics.

Referring to FIG. 1, a battery module 200 includes a cell assembly 100 consisting of a plurality of battery cells and a bus bar assembly 300 provided at both ends of the cell assembly 100 along the X direction to integrate and electrically connect the cell assembly 100. A battery module 200 includes a module housing 210, 214 accommodating a cell assembly 100 and a bus bar assembly 300.

A module housing 210, 214 includes a cell accommodating body 210 which is open at both ends along the X direction and which is in an angulated U-shape with an open upper surface or in a channel shape with an open upper portion. A module housing 210, 214 may further include a cell accommodating cover 214 coupled to an upper portion of a cell accommodating body 210 and a first cover 220 and a second cover 230 coupled to both ends of the cell accommodating body 210 opened based on the X direction. A first cover 220 and A second cover 230 may each be provided with an electrode terminal (not shown) for electrical connection to the outside.

Specifically, a cell accommodating body 210 may include a lower surface 211 facing one side of a cell assembly 100 and supporting the cell assembly 100, and a first side surface 212 and a second side surface 213 bent at both ends of a lower surface 211 and extending towards a cell accommodating cover 214.

Consequently, a module housing may be one sealed hexahedral shape in which two unbent side surfaces and an upper surface are coupled to a first cover 220, a second cover 230, and a cell accommodating cover 214, respectively, in a cell accommodating body 210. Being sealed does not mean that the inside and the outside are completely blocked. Being sealed means that the components inside a module housing are configured not to escape to the outside. For example, this may mean that battery cells inside a module housing do not escape to the outside.

A plurality of battery cells may be electrically connected by a bus bar assembly 300. A bus bar assembly 300 (FIG. 7) may include a bus bar 301 (FIG. 7) electrically connected to battery cells and a bus bar frame 302 (FIG. 7) for supporting a bus bar inside a battery module 200. A bus bar may be made of a metal or polymer with excellent electrical conductivity, and a bus bar frame 312 may be made of an insulating material, but is not limited thereto.

A typical electrode lead may be a plate of a flat shape. A plate may be inserted into a bus bar assembly 300 and welded to be fastened. The shape of an electrode lead may be changed to adjust assembly tolerances that occur when accommodating battery cells in a module housing. The shape of an electrode lead may be changed through cut-bending. However, cut-bending is a process performed after forming an electrode lead, and thus the production may be slowed down, and production cost may be increased.

On the other hand, in a battery module according to the present disclosure, assembly tolerances of battery cells can be easily adjusted by changing the shape of battery cells without performing a cut-banding process.

Figure 2:
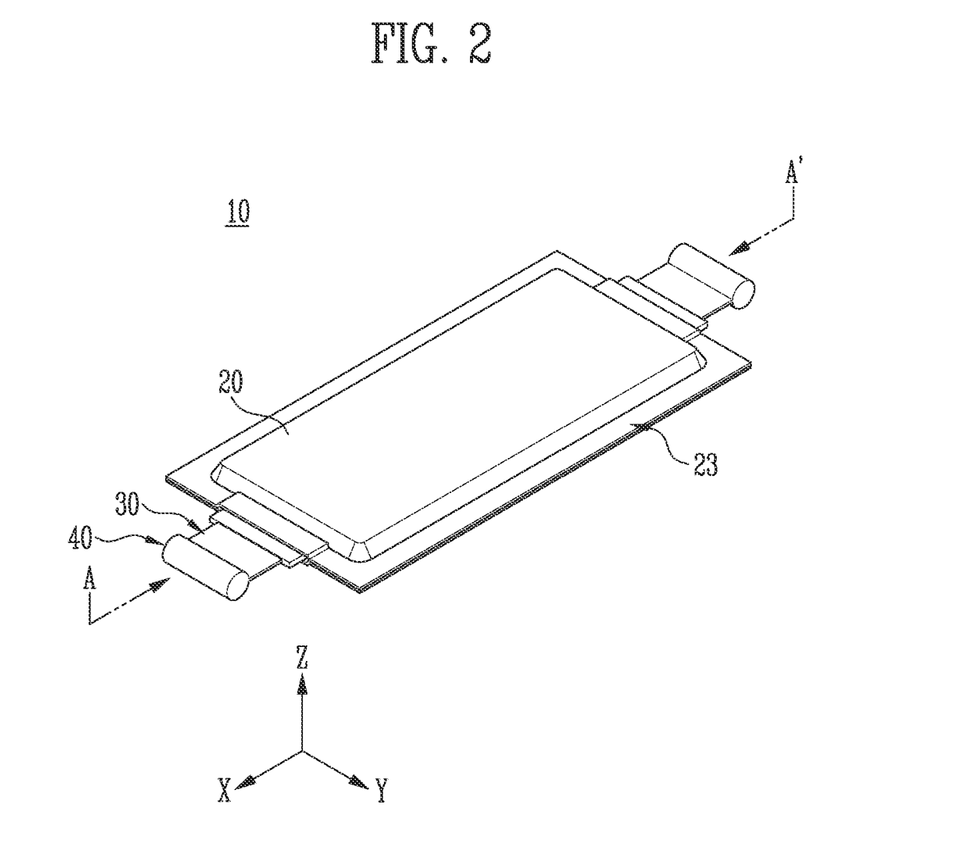
FIG. 2 is an example of a battery cell according to the present disclosure.
Figure 3:
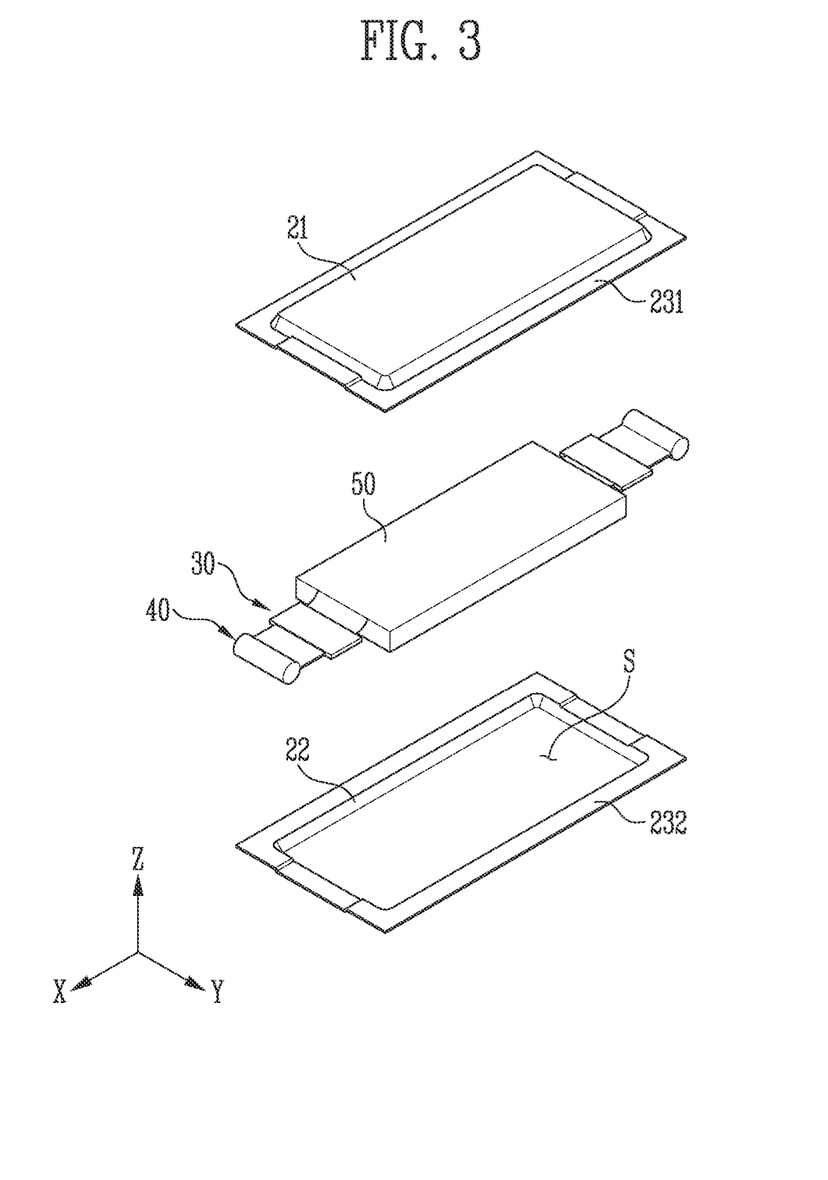
FIG. 3 is an exploded diagram of a battery cell according to the present disclosure.

FIG. 2 is an example of a battery cell according to the present disclosure; and FIG. 3 is an exploded diagram of a battery cell according to the present disclosure.

Battery cells 10 may be classified into a pouch-type secondary battery, a prismatic secondary battery, or a cylindrical secondary battery, depending on the shape of a secondary battery. In the present specification, a pouch-type secondary battery is illustrated as an example for convenience of explanation, but they are not limited thereto.

A battery cell 10 includes an electrode assembly capable of storing and supplying electrical energy, a battery exterior material accommodating the electrode assembly therein, and an electrode lead including a first tab portion that is electrically connected to the electrode assembly and that protrudes out of the battery exterior material and a second tab portion that extends along a first direction in which the first tab portion protrudes from a free end of the first tab portion and that has a different shape from the first tab portion. An electrode lead may be electrically connected to a bus bar assembly.

A second tab portion may be provided with a different length from the length of a first tab portion, based on a second direction perpendicular to a surface provided with the largest area among surfaces of a battery exterior material disposed along a first direction.

Referring to FIG. 2, the X direction which is a direction in which a first tab portion 30 protrudes out of a battery interior material 20 is defined as a first direction; the Z direction which is a direction perpendicular to a surface that is extending along a first direction in which a first tab portion protrudes from a free end and that is provided with the largest area among surfaces of a battery exterior material disposed along a first direction is defined as a second direction; and the Y direction perpendicular to a first direction and a second direction is defined as a third direction.

A battery exterior material 20 may have a hexahedral shape. A battery exterior material 20 may accommodate an electrode assembly 50 therein. A battery exterior material 20 may include a metal layer for mechanical rigidity. Aluminum may be used as a material for a metal layer, but it is not limited thereto. A battery exterior material 20 may further include an insulating layer. An insulating layer may include an insulating material.

An electrode assembly 50 may be capable of storing and supplying electrical energy. An electrode assembly 50 may store electrical energy in the form of chemical energy, convert the chemical energy into electrical energy as needed, and supplies it to the outside of a battery.

An electrode assembly 50 may include a cathode and an anode. A cathode may include a cathode active material, and an anode may include an anode active material which lithium (Li) ions generated from a cathode active material may be inserted into and extracted from. In addition, a cathode and an anode may each further include a binder and a conductive material to improve mechanical stability and electrical conductivity.

An electrode assembly 50 may further include a separator. A separator may be configured to prevent electrical short circuit between a cathode and an anode and to generate a flow of ions. The type of a separator is not particularly limited, but it may include a porous polymer film. An electrode assembly 50 may be manufactured by using a stacking, zigzag stacking, or winding method in which a plurality of cathodes and anodes are alternately stacked and a separator is interposed between a cathode and an anode.

An electrode assembly 50 may further include an electrolyte allowing for migration of a cathode and an anode. For example, an electrolyte may include a lithium salt through which lithium ions may migrate. An electrolyte may be in a liquid state. Alternatively, an electrolyte may be in a solid state.

Referring to FIG. 3, a first tab portion 30 may be electrically connected to an electrode assembly 50. In addition, a first tab portion 30 may protrude out of an battery exterior material 20. The part where a first tab portion 30 is connected to an electrode assembly 50 refers to a fixed end of the first tab portion 30. The part where a first tab portion protrudes outwards refers to a free end of a first tab portion 30.

In an embodiment, a battery exterior material 20 may include an upper case 21 and a lower case 22. An upper case 21 or a lower case 22 may include an accommodating space S for accommodating an electrode assembly 50 therein. An upper case 21 and a lower case 22 may include sealing portions 231, 232 that are sealed along edges of each. When an electrode assembly 50 is accommodated in a battery exterior material 20, a first tab portion 30 may be electrically connected to an electrode assembly 50 and may protrude out of the exterior material. A first tab portion 30 may be interposed between sealing portions 231, 232 of a battery exterior material 20 and protrude outwards.

Referring to FIG. 3, a first tab portion 30 may be provided with a free end, which is an end region that is not fixed to an electrode assembly 50. A second tab portion 40 may be provided by extending from a free end of a first tab portion 30 along the X direction, which is a first direction. A second tab portion 40 may be electrically connected to a bus bar assembly 300.

Based on a third direction, a first tab portion 30 and a second tab portion 40 may be formed to be equal to or shorter than the length of a battery exterior material 20. When a first tab portion 30 and a second tab portion 40 exceed the length of a battery exterior material 20 along a third direction, the energy density and structural stability of a battery module 200 may be reduced.

Figure 4:
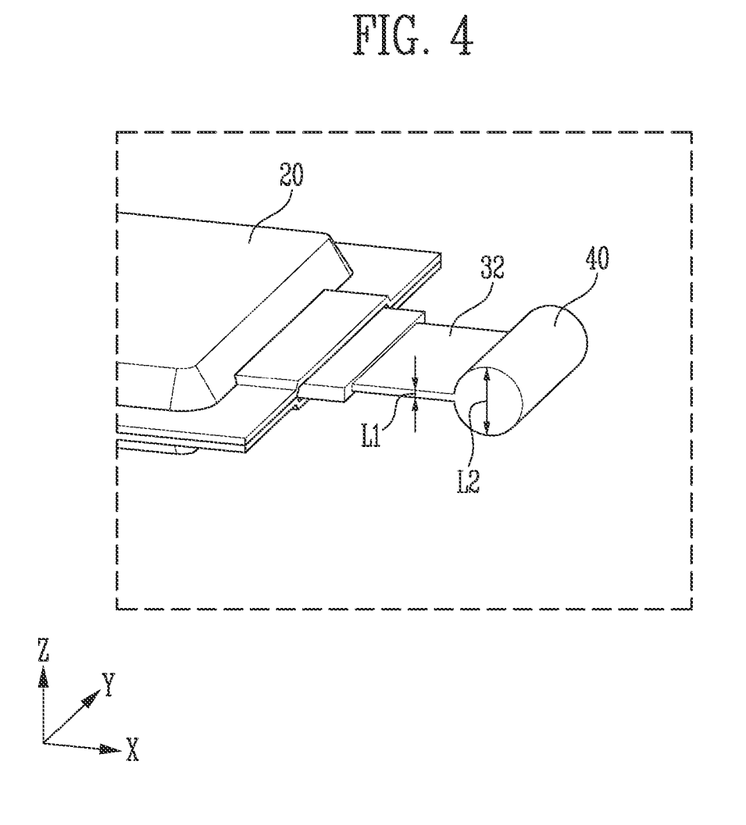
FIG. 4 is an enlarged diagram of a first tab portion and a second tab portion of a battery cell according to the present disclosure.
Figure 5:
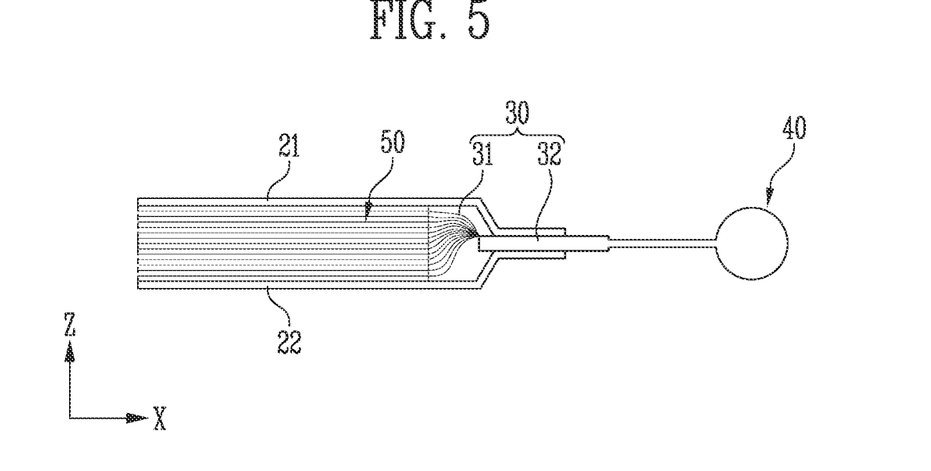
FIG. 5 shows a cross-section cut along line A-A' in FIG. 2.

FIG. 4 is an enlarged diagram of a first tab portion and a second tab portion of a battery cell according to the present disclosure; and FIG. 5 shows a cross-section cut along line A-A' in FIG. 2.

Referring to FIG. 4, a battery module 200 includes a second tab portion 40 provided with a different length from a predetermined length of a first tab portion, based on a second direction perpendicular to a surface provided with the largest area among surfaces of a battery exterior material disposed along a first direction. The length L2 of a second tab portion 40 may be provided to be different from the length L1 of a first tab portion 30 based on a second direction. Specifically, it may be provided to be different from the length L1 of a first tab plate 32.

Through this, even when a first tab portion 30 is inserted into a bus bar assembly 300 and moves in a direction of a second tab portion 40, after a predetermined spacing is formed between bus bar assemblies, the movement may be restricted. A surface provided with the largest area among surfaces of a battery exterior material may be one surface of a main room.

Referring to FIG. 5, a first tab portion 30 may further include an electrode tab 31 and a first tab plate 32. An electrode tab 31 may be connected to an electrode assembly 50. An electrode assembly 50 may include a cathode plate and an anode plate, and an electrode tab 31 may be connected to each of a cathode plate and an anode plate. A cathode plate and an anode plate may include an uncoated portion where an active material is not applied. One end of an electrode tab 31 may be positioned in an uncoated portion to be electrically connected to a cathode plate and an anode plate. The other end of an electrode tab 31 may be connected to a first tab plate 32. A first tab plate 32 may be interposed in a sealing portion 23 (FIG. 2) of a battery exterior material 20 to connect an inside and an outside of a battery exterior material 20.

FIG. 6A, FIG. 6B, FIG. 6C and FIG. 6D show various embodiments of a second tab portion.

Figure 6A:
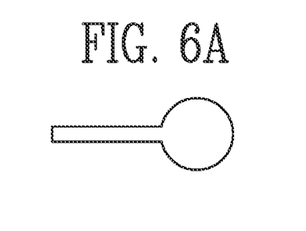
FIG. 6A, FIG. 6B, FIG. 6C and FIG. 6D show various embodiments of a second tab portion.
Figure 6B:
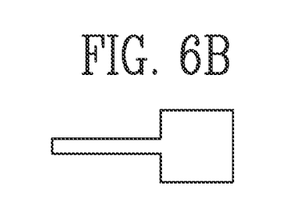
Figure 6C:
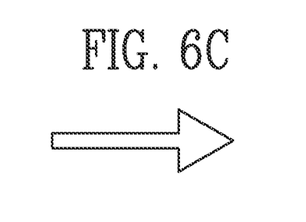
Figure 6D:
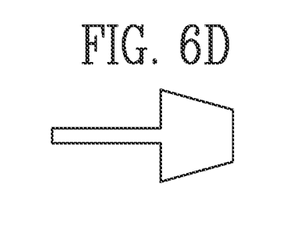

FIG. 6A, FIG. 6B, FIG. 6C and FIG. 6D show a cross-section of a second tab portion 40 cut along line A-A' of FIG. 2. Referring to FIG. 6A, FIG. 6B, FIG. 6C and FIG. 6D, a cross-section of a second tab portion 40 may be provided to be circular (FIG. 6A), rectangular (FIG. 6B), triangular (FIG. 6C), or trapezoidal (FIG. 6D). A second tab portion 40 may be provided in a pillar shape with a cross-section extending in a third direction. When a cross-section of a second tab portion 40 is circular, the second tab portion 40 may have a cylindrical shape extending along a third direction perpendicular to a first direction and a second direction.

Preferably, based on a second direction, the length of a second tab portion 40 may be formed to be equal to or longer than the length of a first tab portion 30. In addition, the length of a second tab portion 40 may be formed to be equal to or shorter than the length of a battery exterior material 20. Because of this, errors may not occur when battery cells are stacked.

A free end of a first tab portion 30 and one end of a second tab portion 40 connected to the free end of the first tab portion 30 may have a same length along a third direction perpendicular to a first direction and a second direction.

In addition, the length of a second tab portion 40 along a third direction may be variable along a first direction.

Figure 7:
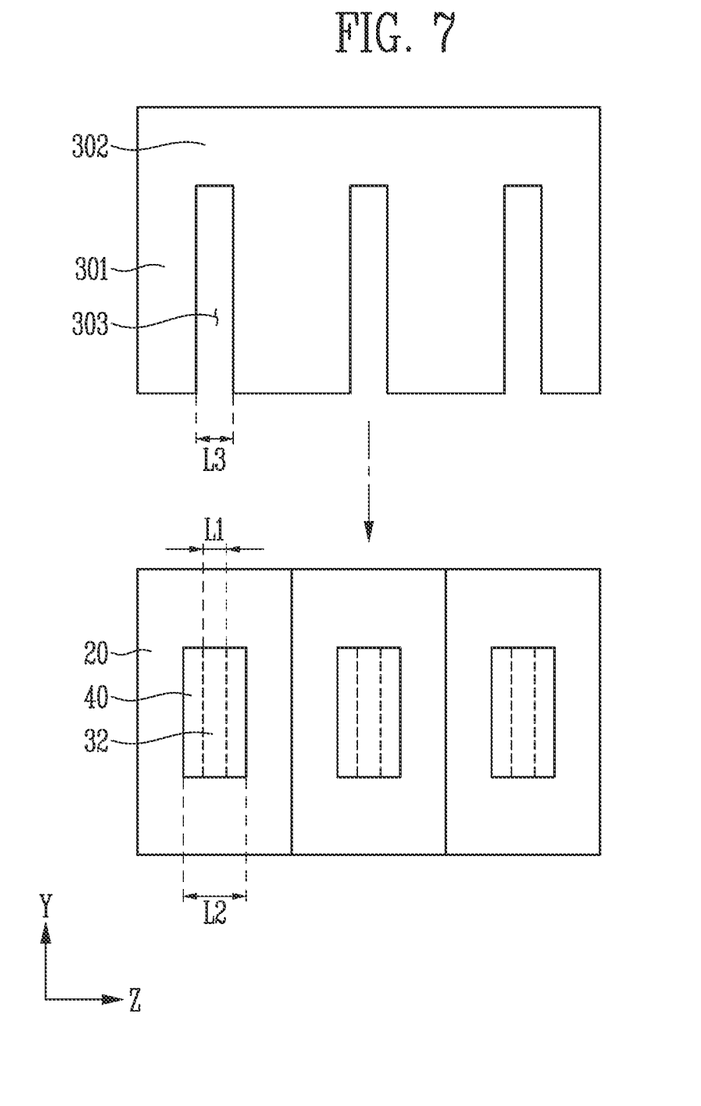
FIG. 7 shows a battery cell and a bus bar assembly.
Figure 8:
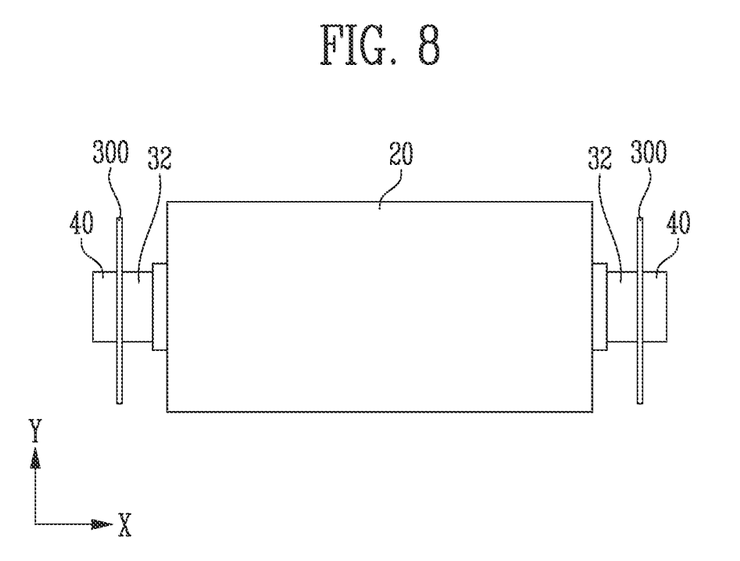
FIG. 8 shows a battery cell combined with a bus bar assembly.

FIG. 7 shows a battery cell and a bus bar assembly; and FIG. 8 shows a battery cell combined with a bus bar assembly.

A bus bar assembly 300 may move along a third direction perpendicular to a first direction and a second direction to be positioned between a battery exterior material 20 and a second tab portion 40. Referring to FIGS. 1 and 7, battery cells 10 may be stacked along the Z direction and accommodated inside a module housing. A bus bar assembly 300 may move along the Y direction.

A bus bar assembly 300 may include one or more insertion portions 303 with one side at least a part of which is open along a third direction. A first tab portion 30 may be inserted into one or more insertion portions 303. One side may be a side where a bus bar assembly 300 meets a first tab portion 30. A bus bar assembly 300 may be fastened by surrounding a first tab portion 30 through an insertion portion 303. Through this, the fastening stability between a battery cell 10 and a bus bar assembly 300 may be improved. Referring to FIG. 7, a bus bar assembly 300 may include an insertion portion 303 at least a part of which is open along the Y direction and may descend along the Y direction so that a first tab portion 30 may be inserted into an insertion portion 303. Based on the Z direction, the length L3 of a bus bar assembly 300 may be formed to be equal to or longer than the length L1 of a first tab portion 30.

Based on a second direction, the length of a second tab portion 40 may be formed to be equal to or longer than the length of an insertion portion 303. Referring to FIG. 7, the length L2 of a second tab portion 40 based on a second direction may be formed to be equal to or longer than the length L3 of an insertion portion 303. Referring to FIG. 8, a bus bar assembly 300 may be inserted in the Y direction and then move along the X direction.

A bus bar assembly 300 may be positioned closer to a second tab portion 40 than a battery exterior material 20. In other words, a bus bar assembly 300 may move forward to a second tab portion 40 along the X direction. A second tab portion 40 is disposed at a predetermined position in consideration of the length of a battery cell 10. As described above, battery cells 10 may be accommodated in a module housing, and the length of battery cells must be uniform to improve energy density and structural stability of a battery module. The length of a battery cell may be the length from the outermost side of one end to the outermost end of the other side of the battery cell. The length of a battery cell may be from the outermost side of a second tab portion provided on one side surface of a battery cell to the outermost side of a second tab portion provided on the other side surface.

When a bus bar assembly 300 moves forward to contact a second tab portion 40, the width an insertion portion of the bus bar assembly 300 may be formed to be smaller than the length of a second tab portion 40 along a second direction so that the movement may be restricted by the second tab portion 40.

A bus bar assembly 300 may be welded to a first tab portion 30 or a second tab portion to be electrically connected thereto. The welding may be laser welding. When viewed from a first direction, the second tab portion 40 may have a structure fully covering holes of an insertion portion. Therefore, welding may be performed in a state where welding direction is vertical, and welding may be performed at a high speed by utilizing a scanner work field.

Figure 9A:
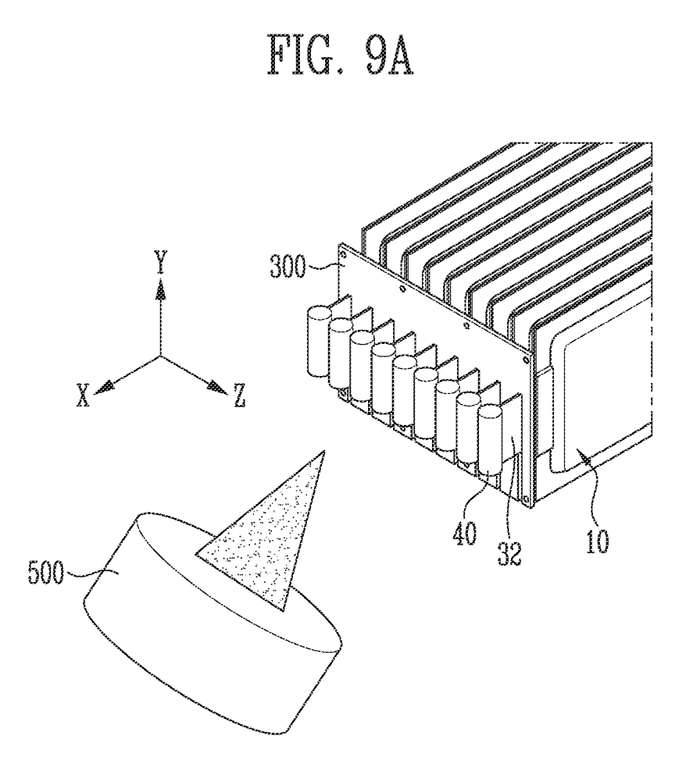
FIG. 9A and FIG. 9B show welding of a bus bar assembly with laser.
Figure 9B:
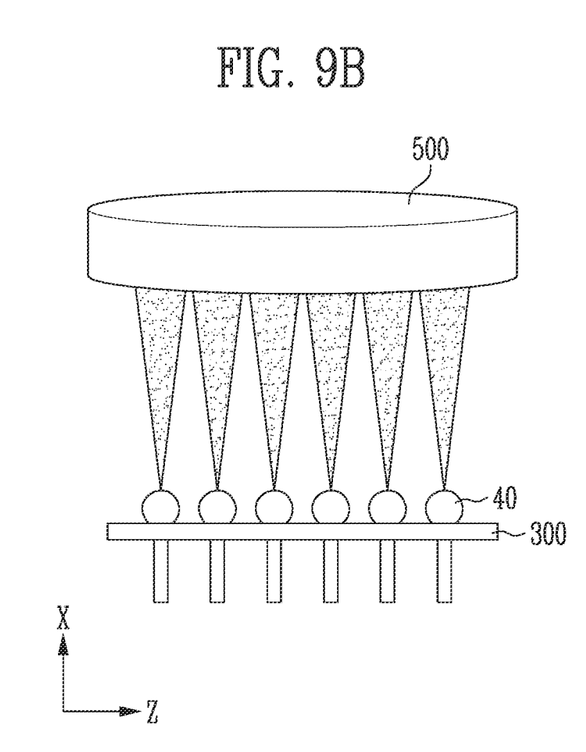

FIG. 9A and FIG. 9B show welding of a bus bar assembly with laser.

Referring to FIG. 9A and FIG. 9B, welding may be performed by irradiating laser perpendicularly to a bus bar assembly. For example, laser may be irradiated to a bus bar assembly in the X direction.

Figure 10A:
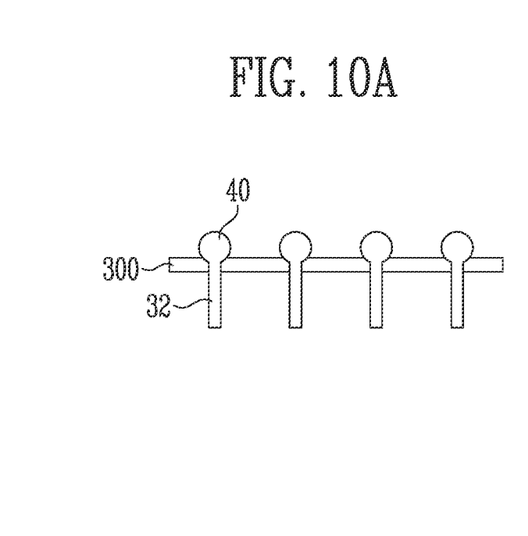
FIG. 10A, FIG. 10B and FIG. 10C show a bus bar assembly according to another embodiment.
Figure 10B:
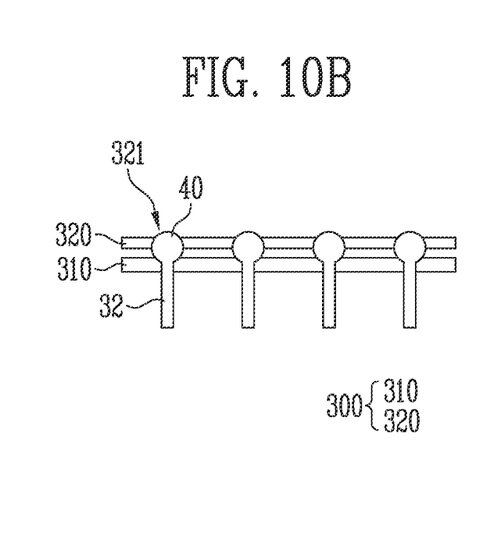
Figure 10C:
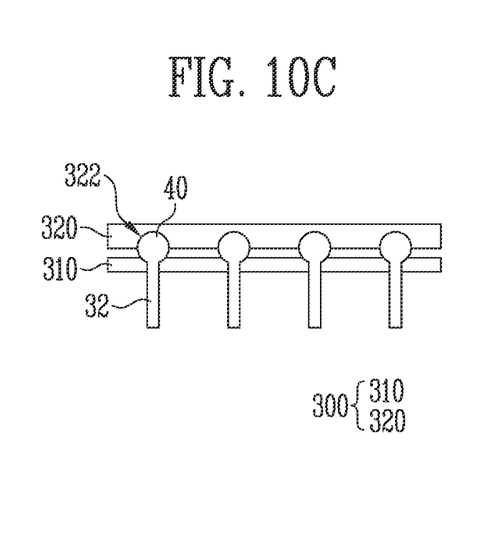

FIG. 10A, FIG. 10B and FIG. 10C show a bus bar assembly according to another embodiment.

A bus bar assembly 300 may further include a protective member 320. A protective member may protect a bus bar assembly from an external shock. A protective member may be formed of a same material as a bus bar assembly. Alternatively, a protective member may include a material with enhanced mechanical rigidity and durability. Through this, a protective member may not be damaged by an external shock.

A protective member may include an opening portion 321 a part of which is open. A second tab portion may be exposed through an opening portion. The connection between a second tab portion and a bus bar assembly may be confirmed through the exposure. Alternatively, a bus bar assembly may have an unopened plate shape. An area corresponding to a second tab portion may include a seating portion 322 at part of which is indented.

Figure 11:
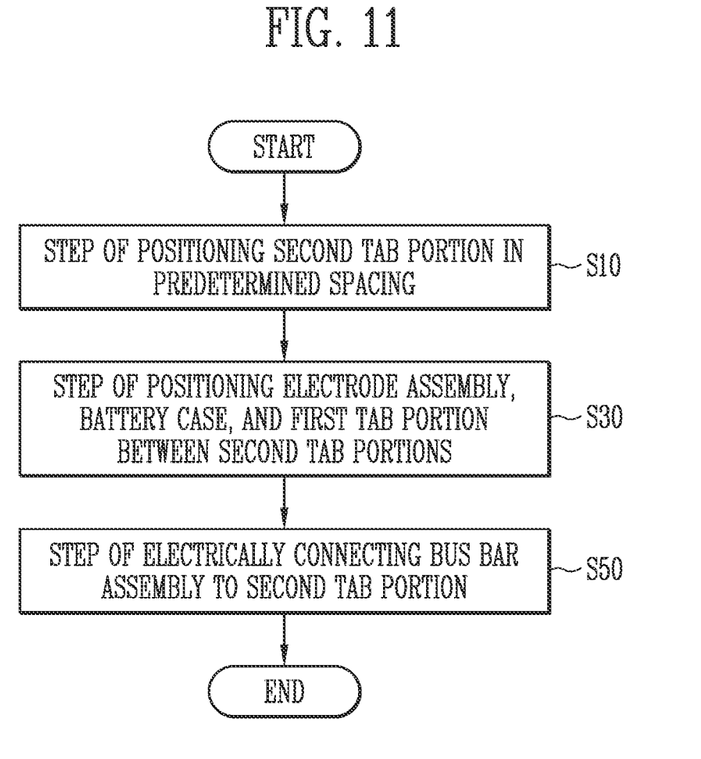
FIGS. 11 and 12 are flowcharts showing an example of a manufacturing method of a battery module according to the present disclosure.
Figure 12:
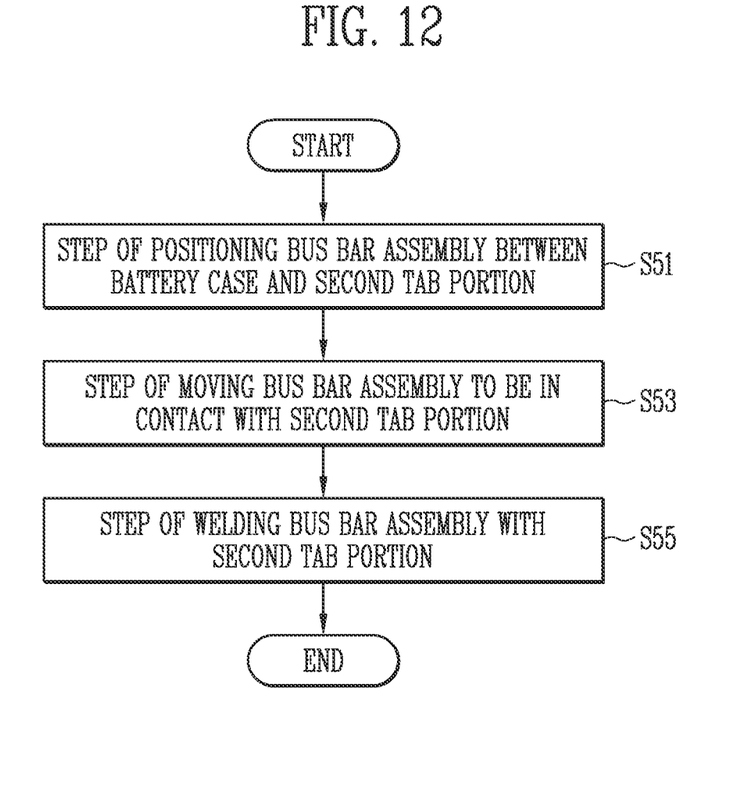

FIGS. 11 and 12 are flowcharts showing an example of a manufacturing method of a battery module according to the present disclosure.

Referring to FIGS. 11 and 12, another manufacturing method of a battery module according to the present disclosure, which is a manufacturing method of a battery module including an electrode assembly capable of storing and supplying electrical energy; a battery exterior material accommodating the electrode assembly therein; and a first tab portion that is electrically connected to an electrode assembly and that protrudes to an outside of a battery exterior material, includes: a step of disposing in a predetermined spacing a second tab that extends along a first direction in which a first tab portion protrudes from a free end of a first tab portion and that is provided with a different length from a predetermined length of a first tab portion, based on a second direction perpendicular to a surface provided with the largest area among surfaces of a battery exterior material disposed along a first direction; a step of positioning a pre-assembled electrode assembly, a battery exterior material, and a first tab portion between second tab portions spaced in a predetermined spacing; and a step of electrically connecting a bus bar assembly to a second tab portion.

The predetermined spacing of a second tab portion 40 is a value determined in consideration of the length of a battery cell 10. When a second tab portion 40 is positioned at both ends of a battery cell 10, and a spacing of a second tab portion 40 is determined, the length of a battery cell 10 may be determined. In other words, when a second tab portion 40 is disposed in a predetermined spacing, a plurality of battery cells 10 will be manufactured to have a uniform length.

A manufacturing method of a battery module according to the present disclosure may include a step S30 of disposing a second tab portion in a predetermined spacing and of positioning an electrode assembly 50, a battery exterior material 20, and a first tab portion 30 between second tab portions 40. While an electrode assembly 50 is accommodated in a battery exterior material 20, and an electrode assembly 50 and a first tab portion 30 are electrically connected, a first tab portion 30 may be disposed in a shape protruding out of a battery exterior material 20. At this time, a free end of a first tab portion 30 and a second tab portion 40 may be connected.

Different from the steps described above, a manufacturing method according to the present disclosure may include a step of manufacturing a second tab portion 40 through an additional process after manufacturing battery cells 10 including a first tab portion 30. In an embodiment, a second tab portion 40 may be manufactured by cutting a first tab portion 30 through a tailor roll method. The thickness of a first tab portion 30 may be adjusted through the tailor roll method. In this case, a step S10 of disposing a second tab portion in a predetermined spacing may be omitted.

A manufacturing method according to the present disclosure may include a step S50 of electrically connecting a bus bar assembly 300 to a second tab portion 40 after stacking battery cells 10. A step S50 of electrically connecting a bus bar assembly 300 to a second tab portion 40 may include a step S51 of positioning a bus bar assembly 300 between a battery exterior material 20 and a second tab portion 40. In a step of positioning a bus bar assembly 300 between a battery exterior material 20 and a second tab portion 40, a first tab portion 30 will be inserted into a bus bar assembly 300.

A step S51 of positioning a bus bar assembly 300 between a battery exterior material 20 and a second tab portion 40 may be characterized in that a bus bar assembly 300 moves towards a first tab portion 30 along a third direction so that a first tab portion 30 is inserted into the bus bar assembly. A bus bar assembly 300 may be provided with an insertion portion with one side at least a part of which is open so that a first tab portion 30 is inserted thereto. A first tab portion 30 will be inserted into an insertion portion.

A step S50 of electrically connecting a bus bar assembly 300 to a second tab portion 40 may further include a step S53 of moving a bus bar assembly 300 in a direction away from a battery exterior material 20 along a first direction to be in contact with the second tab portion 40. A bus bar assembly 300 may move to come into close contact with a second tab portion 40 while a first tab portion 30 is inserted.

A step S50 of electrically connecting a bus bar assembly 300 to a second tab portion 40 may further include a step S55 of welding a bus bar assembly 300 to a second tab portion 40.

A step S55 of welding a bus bar assembly may be characterized in that welding is performed by irradiating laser to a second tab portion 40. A direction in which laser is irradiated may be perpendicular to a bus bar assembly. Through this, accuracy of welding and welding speed may be improved.

The present disclosure may be modified and implemented in various forms, and its scope is not limited to the embodiments described above. Therefore, if a modified embodi-

What is claimed is:

1. A battery module comprising:
a plurality of battery cells and a bus bar assembly connecting the plurality of battery cells,
wherein each of the plurality of battery cells includes:
an electrode assembly capable of storing and supplying electrical energy;
a battery exterior material accommodating the electrode assembly therein; and
an electrode lead including a first tab portion that is electrically connected to the electrode assembly and that protrudes to an outside of the battery exterior material, and a second tab portion that extends along a first direction in which the first tab portion protrudes from a free end of the first tab portion and that has a different shape from the first tab portion,
wherein the bus bar assembly is positioned between the battery exterior material and the second tab portion to be electrically connected to the electrode lead,
wherein the second tab portion is provided with a different length from the length of the first tab portion, based on a second direction perpendicular to a surface provided with the largest area among surfaces of the battery exterior material disposed along the first direction, and
wherein the bus bar assembly includes one or more insertion portions with one side at least a part of which is open along a third direction perpendicular to the first direction and the second direction.

2. The battery module according to claim 1, wherein the bus bar assembly is welded with the first tab portion or the second tab portion to be electrically connected thereto.

3. The battery module according to claim 1, wherein the length of the second tab portion is equal to or longer than the length of the first tab portion.

4. The battery module according to claim 1, wherein the free end of the first tab portion and one end of the second tab portion connected to the free end of the first tab portion have a same length along a third direction perpendicular to the first direction and the second direction.

5. The battery module according to claim 4, wherein the length of the second tab portion along the third direction is variable along the first direction.

6. The battery module according to claim 1, wherein the second tab portion has a cylindrical shape extending along a third direction perpendicular to the first direction and the second direction.

7. The battery module according to claim 1, wherein the first tab portion is inserted into the one or more insertion portions.

8. The battery module according to claim 1, wherein, based on the second direction, the length of the second tab portion is equal to or longer than the length of the insertion portion.

9. The battery module according to claim 1, wherein the bus bar assembly is positioned closer to the second tab portion than the battery exterior material.

10. The battery module according to claim 1, wherein, based on a third direction perpendicular to the first direction and the second direction, the length of each of the first tab portion and the second tab portion is formed to be equal to or shorter than the length of the battery exterior material.

11. The battery module according to claim 10, wherein the length of the second tab portion is formed to be equal to or greater than the length of the first tab portion.

12. A battery module comprising:
a plurality of battery cells and a bus bar assembly connecting the plurality of battery cells,
wherein each of the plurality of battery cells includes:
an electrode assembly capable of storing and supplying electrical energy;
a battery exterior material accommodating the electrode assembly therein; and
an electrode lead including a first tab portion that is electrically connected to the electrode assembly and that protrudes to an outside of the battery exterior material, and a second tab portion that extends along a first direction in which the first tab portion protrudes from a free end of the first tab portion and that has a different shape from the first tab portion, and
wherein the bus bar assembly is positioned between the battery exterior material and the second tab portion along the first direction to be electrically connected to the electrode lead and includes one or more insertion portions with one side at least a part of which is open along a third direction perpendicular to the first direction and the second direction.

* * * * *